US012736167B2

(12) United States Patent
Cuthbert

(10) Patent No.: US 12,736,167 B2
(45) Date of Patent: Sep. 15, 2026

(54) APPARATUS FOR REMOVABLE MOUNTING OF A HOSE INTO AN AIR-CONDITIONING DUCT

(71) Applicant: CUTHBERT ENGINEERING LTD., Vancouver (CA)

(72) Inventor: Patrick Sean Brian Cuthbert, Vancouver (CA)

( * ) Notice: Subject to any disclaimer, the term of this patent is extended or adjusted under 35 U.S.C. 154(b) by 390 days.

(21) Appl. No.: 18/450,271

(22) Filed: Aug. 15, 2023

(65) Prior Publication Data

US 2025/0060062 A1 Feb. 20, 2025

(51) Int. Cl.

| | |
|---|---|
| ***F16L 55/11*** | (2006.01) |
| ***F16L 11/15*** | (2006.01) |
| ***F16L 11/20*** | (2006.01) |
| ***F16L 55/115*** | (2006.01) |
| ***F16L 59/14*** | (2006.01) |
| ***F24F 13/02*** | (2006.01) |

(52) U.S. Cl.

CPC ........... *F16L 55/1108* (2013.01); *F16L 11/15* (2013.01); *F16L 11/20* (2013.01); *F16L 55/115* (2013.01); *F16L 59/14* (2013.01); *F24F 13/0209* (2013.01)

(58) Field of Classification Search

CPC ...... F16L 55/1108; F16L 55/115; F16L 59/14; F16L 11/15; F16L 11/20; F24F 13/0209

See application file for complete search history.

(56) References Cited

U.S. PATENT DOCUMENTS

| | | | | | |
|---|---|---|---|---|---|
| 2,865,653 | A * | 12/1958 | Nixon | B60K 15/05 | 16/292 |
| 4,185,844 | A * | 1/1980 | Hubbard | B60K 15/04 | 280/834 |
| 4,653,711 | A * | 3/1987 | Marshell | B60K 15/0406 | 220/744 |
| 4,811,765 | A * | 3/1989 | Giha | B60S 5/02 | 141/390 |
| 4,811,984 | A * | 3/1989 | Hempel | B60K 15/05 | 296/202 |
| 5,109,756 | A * | 5/1992 | Barboza | F24F 13/062 | 454/284 |
| 5,118,019 | A * | 6/1992 | Harrison | B60K 15/05 | 224/555 |
| 5,165,749 | A * | 11/1992 | Sheppard | B60K 15/05 | 296/97.22 |

(Continued)

OTHER PUBLICATIONS amazon.com, Product Listing for "Mobile AC+ Dual Size Exhaust Hose Flange Wall Mount Connector for Portable AC Vent, 5 and 5.5 Inches Hose Compatible, White, Off Season Cover Plug Included Omni-directional", Website: https://www.amazon.com/Connector-Portable-AC-Compatible-Omni-directional/dp/B09T26H6S6 Date accessed: Aug. 15, 2023.

*Primary Examiner* — William M McCalister

(57) ABSTRACT

An apparatus for removable mounting of a corrugated hose into an air-conditioning duct, a building structure including the same, and a method of terminating an air-conditioning duct. The apparatus comprises a unitary body defining a tube that is sealingly engageable with the duct and a flange at an end of the hose for abutting a wall around the duct, a plug sealingly engageable in the tube, and a cap. The tube is configured to selectively threadably receive the plug or the hose. The cap is pivotably attached to the flange to allow the cap to be rotated towards the flange to cover the tube.

17 Claims, 6 Drawing Sheets

(56) References Cited

U.S. PATENT DOCUMENTS 5,472,108 A * 12/1995 Skudlarek .............. B60K 15/04 220/326
5,509,569 A * 4/1996 Hiranuma .......... B60K 15/0406 220/86.1
5,538,312 A * 7/1996 Lehmkuhl .................. B60J 5/06 280/853
5,580,019 A * 12/1996 Glesser .................. B60K 15/05 224/400
5,954,387 A * 9/1999 Fisher ................ B60K 15/0406 296/97.22
6,508,501 B1 * 1/2003 Meinke .................. B60K 15/04 280/853
6,880,593 B1 * 4/2005 Swane .................... B29C 66/61 141/286
7,108,600 B1 * 9/2006 Krzyskowski .......... F24F 13/02 454/332
7,566,089 B2 * 7/2009 Alfaro .................... B60K 15/05 280/853
7,740,301 B2 * 6/2010 Hirano ................... B60K 15/05 296/97.22
7,922,231 B2 * 4/2011 Schoenow ............. B60K 15/05 296/97.22
8,186,738 B2 * 5/2012 Winkler ................. B60K 15/05 296/97.22
8,833,013 B2 * 9/2014 Harman .................. F16L 3/003 52/220.8
10,422,458 B2 * 9/2019 Smith ................. F24F 13/0209
10,443,887 B2 * 10/2019 Salomonsson .......... F24F 13/24
10,752,109 B2 * 8/2020 Kim ....................... B60K 15/05
12,044,428 B2 * 7/2024 White ................. F24F 13/0218
2003/0230357 A1 * 12/2003 Crowley ................ B60K 15/04 141/286
2005/0280276 A1 * 12/2005 McComsey ............ B60K 15/05 296/97.22
2015/0099454 A1 * 4/2015 Hikmet ............... F24F 13/0209 454/284
2020/0298697 A1 * 9/2020 Lee ........................ B60K 15/05

* cited by examiner 106
136
150
134
114B 104
130
132
118
150
122
112
116
110
114A 108
118
154
120
120
124
126
150
120
120
128

APPARATUS FOR REMOVABLE MOUNTING OF A HOSE INTO AN AIR-CONDITIONING DUCT

TECHNICAL FIELD

The disclosure relates generally to terminations for air-conditioning ducts, and more particularly to devices for mounting of hoses into air-conditioning ducts.

BACKGROUND

With warming climates, building codes are moving towards mandating air-conditioning in condominium units. Even when no such mandates exist, consumers are demanding such facilities in new units. It is expensive to install central air-conditioning; significant increases in costs are to be expected. Window air-conditioners, split-unit air conditioners, and other air-conditioning options that are not "built-in" are much more cost-effective, especially since such costs can at least partially be borne by consumers, and can also be retrofit in existing, older units. However, these other air-conditioning options tend to be unsightly and unattractive to consumers because of exposed ducting and/or blockage of valuable window openings. As such, real estate developers have been constructing built-in ducts (rough-ins) in apartment units that allow for a portable air-conditioning hose to connect thereto to allow fluid communication between the indoors and the outdoors.

These built-in ducts are typically provided with a whisper grille that can be removed when an air-conditioner is connected thereto. The ducts extend through a wall of the home to the outside and are stuffed with low-grade, removable insulation (e.g. fiberglass batt). To install an air-conditioner, the cap and the insulation are removed and an air-conditioning hose is inserted. The outer end of the duct may be connected to an outdoor unit. The hose is commonly retained in-place by duct-tape, which can be unsightly, can cause damage, and is not a permanent solution.

With such assemblies, installing or uninstalling air-conditioning units can be time consuming and require the user to be diligent and careful. These assemblies also adversely affect air tightness, which is particularly important for the home's overall energy efficiency. It is not uncommon for duct to be left open because of misplacement of caps. This is not only visually unattractive but also increases heat exchange between indoor and outdoor environments, e.g. this may lead to higher overall energy use.

SUMMARY

In some aspects, there is disclosed an apparatus for removable mounting of a hose into an air-conditioning duct extending through a wall between an indoor space and an outdoor space to allow fluid communication therebetween via the hose, the hose being corrugated along its length to allow threadable engagement. The apparatus also comprises a unitary body, including a tube that is threadably engageable with the hose and adapted for insertion into the duct so as to cause sealing engagement of the tube with the duct, a flange disposed at an end of the tube for abutting the wall around the duct upon the tube being fully inserted into the duct; a plug adapted to threadably engage with the tube in place of threadable engagement of the hose with the tube so as to allow sealing of the plug against the body to sealingly close the tube when the hose is displaced out of the tube; and a cap pivotably attached to the flange to allow the cap to be rotated towards the flange to cover the tube.

In some aspects, there is disclosed a method of terminating an air-conditioning duct extending through a wall between an indoor space and an outdoor space to allow fluid communication therebetween via a hose that is suitable for removably mounting into the air-conditioning duct, the hose being corrugated along its length to allow threadable engagement. The method also comprises receiving a tube in the duct to sealingly engage the tube with the duct, the tube adapted to threadably engage with the hose to receive the hose in the tube; threadably engaging a plug with the tube to sealingly receive the plug in the tube in place of the hose to block the duct; and receiving a cap onto a flange surrounding the tube to cover the tube and the plug by pivoting of the cap towards the flange, the cap defining a plurality of tabs extending from a face of the cap and being positioned relative to each other to frictionally engage with opposite sides of the plug to allow clamping of the plug onto the cap when the plug is displaced out of the tube.

In some aspects, there is disclosed a building structure extending between an outdoor space and an indoor space, the building structure including a wall facing the indoor space. The building structure also comprises an air-conditioning duct that is formed in the wall, the air-conditioning duct extending between the indoor space and the outdoor space to allow fluid communication therebetween via a hose that is corrugated along its length to allow threadable engagement; a unitary body, including a tube disposed inside the duct and sealingly engaged with the duct, the tube being adapted to threadably engage with the hose, a flange disposed at an end of the tube so as to abut the wall around the duct; a plug threadably engaged with the tube in place of threadable engagement of the hose with the tube so as to cause sealing of the plug against the body to sealingly close the tube; and a cap pivotably attached to the flange to allow the cap to be rotated towards the flange to cover the tube, the cap defining a plurality of tabs extending from a face of the cap and being positioned relative to each other to frictionally engage with opposite sides of the plug to allow clamping of the plug onto the cap when the plug is displaced out of the tube.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

There is described herein an apparatus for removable mounting of a portable air-conditioner hose into an air-conditioning duct.

Aspects of various embodiments are described in relation to the figures.

Figure 1:
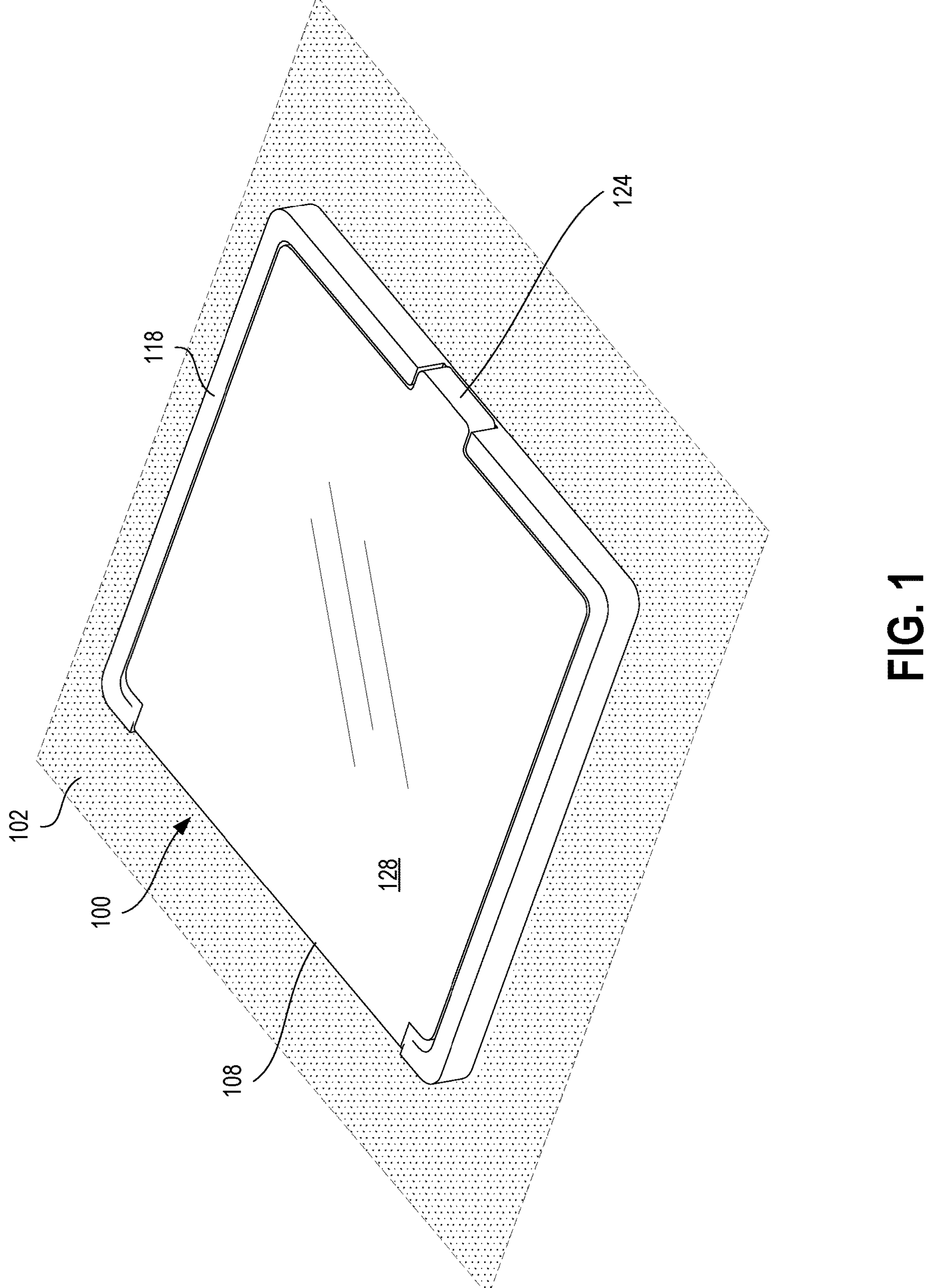
FIG. 1 is a perspective view of an apparatus for removable mounting of a hose into an air-conditioning duct, shown installed in a building structure, in accordance with an embodiment.

FIG. 1 is a perspective view of an apparatus 100 for removable mounting of a hose into an air-conditioning duct, shown installed onto a wall 102 of a building structure, in accordance with an embodiment.

Figure 2:
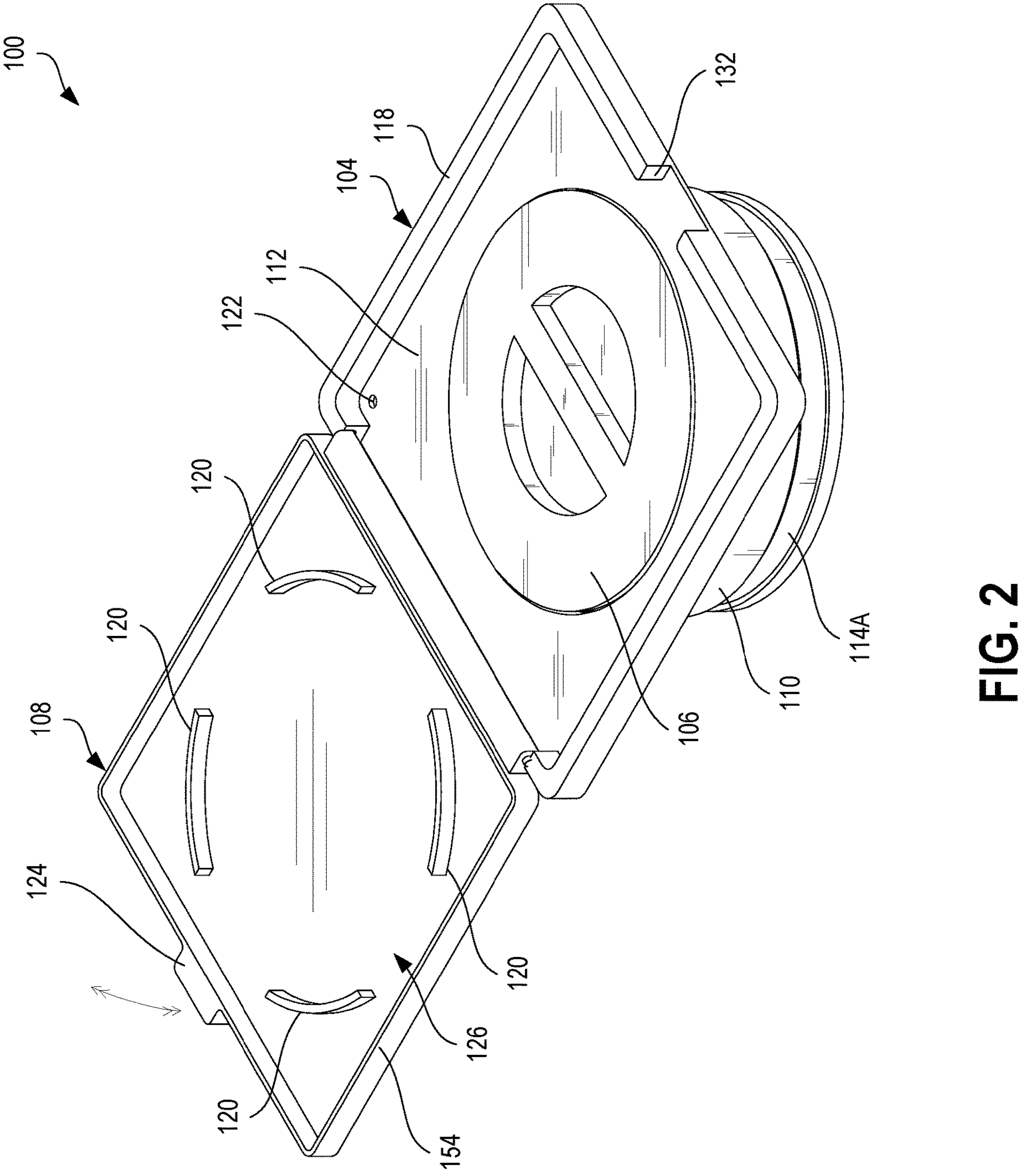
FIG. 2 is a perspective view of an apparatus for removable mounting of a hose into an air-conditioning duct, in accordance with an embodiment.

FIG. 2 is a perspective view of the apparatus 100 of FIG. 1, shown prior to (or after) installation, in accordance with an embodiment.

The apparatus comprises a body 104, a (removable) plug 106, and a cap 108. The body is sealingly mounted into a building structure containing the duct, and the cap is pivotably attached thereto. The plug 106 is removably and sealingly engaged with the body to allow selective placement of the hose in the tube to connect the hose to the duct. The plug 106 incorporates an insulator, e.g. in the form of a vacuum cavity, insulating material-filled cavities, or insulating material in unitary construction with the plug 106. As such, the duct may remain sealed when not in use and the apparatus may form an insulating barrier.

Air-conditioning hoses are typically corrugated along their length. In a corrugated hose, one or more grooves, helically continuous along the length of the hose or circular, are formed on the hose. In various embodiments, each of such grooves may be approximately V-shaped so as to allow opposite sides thereof to rotated towards each other to open or close the groove. Such grooves (material removed from the hose) allow impart flexibility to the hose by allowing compression of the hose, since the opposing sides of grooves of the hose can rotate on to each other.

As will be illustrated later, the body 104 is configured to threadably engage with such grooves or corrugations of the hose by incorporating radially protruding ridges or threads 116 that are complementary to the grooves. Advantageously, this allows retention of the hose on to the body 104 without the use of external aids, such as duct tape. The plug 106 may also comprise grooves complementary to the threads on the body 104, e.g. grooves similar to those formed on the hose. This allows the plug 106 to retainably engage with the body 104 to allowing sealing of the duct when the duct is not in use.

Figures 3, 4, 5:
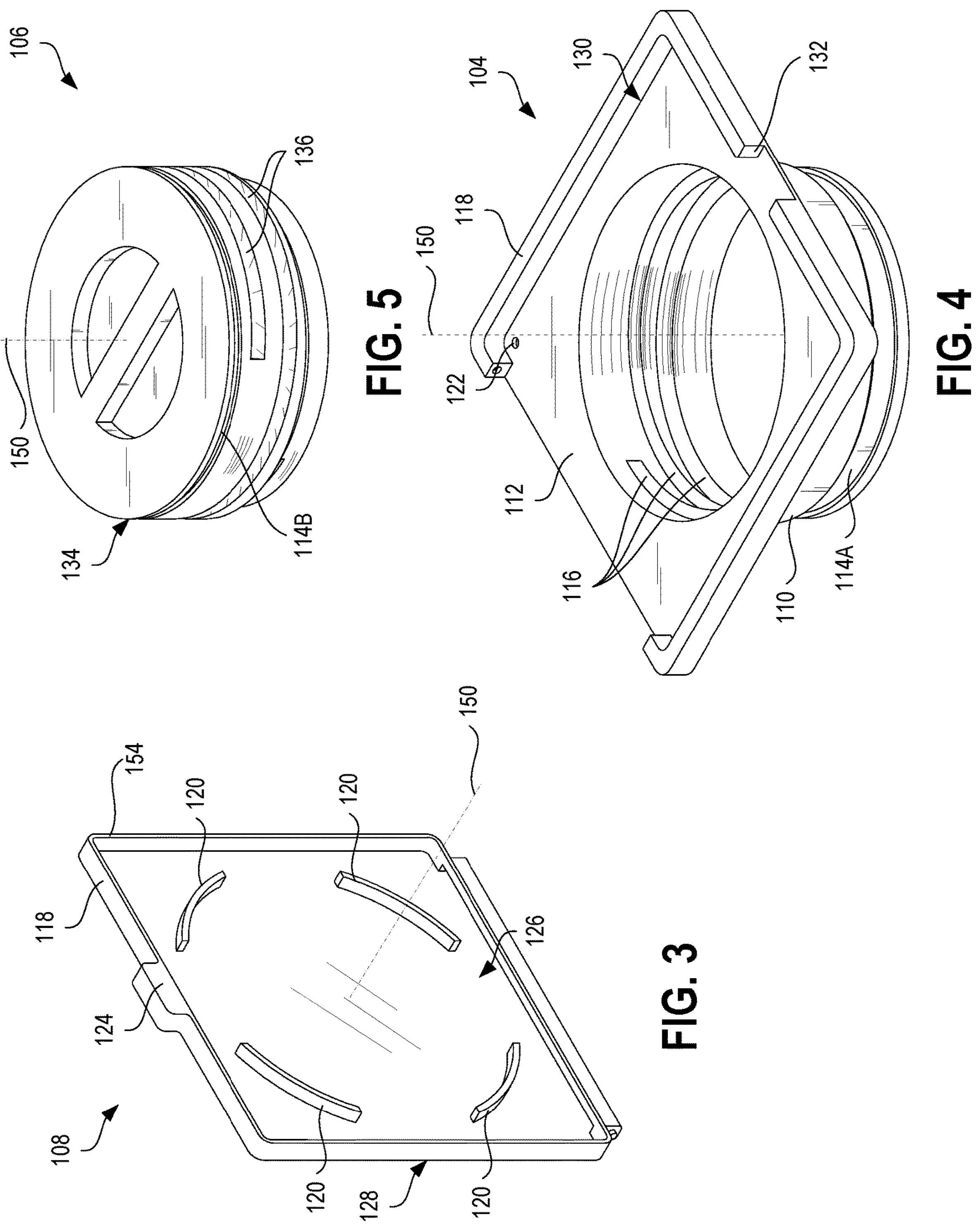
FIG. 3 is a perspective view of a cap, in accordance with an embodiment.
FIG. 4 is a perspective view of a body, in accordance with an embodiment.
FIG. 5. is a perspective view of a plug, in accordance with an embodiment.

FIGS. 3-5 are perspective views of the cap 108, body 104, and the plug 106, respectively, in accordance with various embodiments.

Referring to FIGS. 1-5, the body 104 includes a tube 110 and a flange 112. The body 104 is a unitary body wherein the tube 110 and the flange 112 are in unitary construction. The tube 110 is configured to be received into, and sealingly engaged with, the duct.

The cap 108 is pivotably attached to the flange 112 to allow the cap 108 to be rotated towards and away from the flange 112 to cover the tube 110. The double-headed arrow in FIG. 2 indicates the direction of rotation of the cap 108.

The flange 112 is disposed at an end of the tube 110 for abutting the wall 102 around the duct when the tube 110 is fully inserted into the duct. The flange 112 may include apertures, such as aperture 122, for fastening the body 104 onto the wall 102 around the duct. Advantageously, the body 104 may thereby be substantially permanently fixed in-place. In various embodiments, the flange 112 may be planar or substantially planar.

The flange 112 may define an outer edge 130. In various embodiments, the outer edge 130 may be rectangular, circular, or other shape. In various embodiments, the flange 112 may include a rim 118 extending along opposite first and second sides of the outer edge 130, as shown in FIG. 4. In various embodiments, the cap 108 may be pivotably attached to a third side of the outer edge 130, separate from the first and second sides, to allow pivoting of the cap 108 towards and away from a fourth side of the outer edge 130 opposite to the third side. The rim 118 may extend along the fourth side of the outer edge 130. In various embodiment the first and second sides of the outer edge 130 may be lateral to the third and fourth sides.

In various embodiments, a slot 132 may be formed in the rim 118 along the fourth side. The slot 132 may be complementary to a tongue 124 extending outwardly from the cap 108 so as to be received in the slot 132 when the cap 108 is rotated on to the flange 112. In various embodiments, fastening means may be provided on the tongue 124 to allow securable fastening of the cap 108 to the body 104. For example, such fastening means may include a clasp, or a protrusion configured to engage with an aperture to retain the cap 108 in a closed position.

The cap 108 may define one or more faces, including an inner face 126 (an axially inner face) that faces the flange 112 when the cap 108 is closed on top of the tube 110 and/or the duct and an outer face 128 that is opposite to the inner face 126.

A plurality of tabs 120 may extend from a face of the cap 108. In various embodiments, the plurality of tabs 120 may extend outwardly from the inner face 126. In some embodiments, it is understood that the plurality of tabs 120 may be disposed on the outer face 128. However, it may be particularly advantageous for positioning of the plurality of tabs 120 on the inner face 126. The plurality of tabs 120 are positioned relative to each other to frictionally engage with opposite sides of the plug 106. This may allow clamping of the plug 106 onto the cap 108 when the plug 106 is displaced out of the tube 110. The plurality of tabs 120 may grip on to the radially outer end 134.

In some embodiments, the plurality of tabs 120 may be four arc-shaped protrusions distributed around a central axis 150 to clamp on to the radially outer end of the plug 106. For example, the arc-shaped protrusions may form fragments of a notional circle.

Clamping of the plug 106 onto the cap 108 may allow retaining of the plug 106 on to the cap 108. This may help mitigate loss or misplacement of the plug 106 when the duct is in use. For example, the air-conditioning duct may be connected to an air-conditioner via the tube 110 during hot weather (in the summer) and sealed via the plug 106 during cold weather (in the winter), or vice versa. It is understood that air-conditioning, as referred to herein, may refer to heating or cooling of air.

In various embodiments, the cap 108 may define a rim 154 extending around the cap 108. The rim 154 may extend in an inward direction towards the tube 110 and serve as a spacer to space the inner facer 126 of the cap 108 away from the tube 110.

The tube 110 defines one or more internal threads 116 for allowing threadable engagement with the grooves of corrugated hoses. For example, the internal threads 116 may be ridges extending radially from an internal surface of the tube 110.

The tube 110 may define a seat 114A for receiving one or more sealing members, e.g. gaskets, or O-rings. The seat 114A extends circumferentially around the tube 110 for receiving the sealing member(s).

The plug 106 may be complementary to the tube 110 for being received in the tube 110. The plug 106 is adapted to threadably engage with the tube 110 so as to allow sealing of the plug 106 against the body 104 to sealingly close the tube 110 when the hose is displaced out of the tube 110. The plug 106 may define a seat 114B for one or more sealing member(s) for sealingly closing the plug 106 against the tube 110. The seat 114B extends circumferentially around the plug 106 for receiving the sealing member to allow sealing of the plug 106 against the body 104 to sealingly close the tube 110.

The plug 106 may define a radially outer end 134. The plug 106 may be substantially cylindrical shape such that the radially outer end 134 is circular. One or more grooves 136 may extend at least partially circumferentially around the radially outer end 134 of the plug 106 to allow threadable engagement of the plug 106 with the (one or more) internal threads 116 of the tube 110.

As shown in FIG. 2, in various embodiments, the plug 106 and the tube 110 are configured to engage with each other such that an axially outer face of the plug 106 is flush with the flange 112 adjacent to the tube 110 when the plug 106 is fully engaged with the tube 110.

As shown in FIG. 5, the plug 106 may define at least two indentations or depressions formed on an outer surface thereof to allow handling of the plug 106. Advantageously, the plug 106 may thereby be handled without forming of protrusions thereon, e.g. which may interfere with the cap 108 and may allow the plug 106 to remain flush with the flange 112.

Figure 6A:
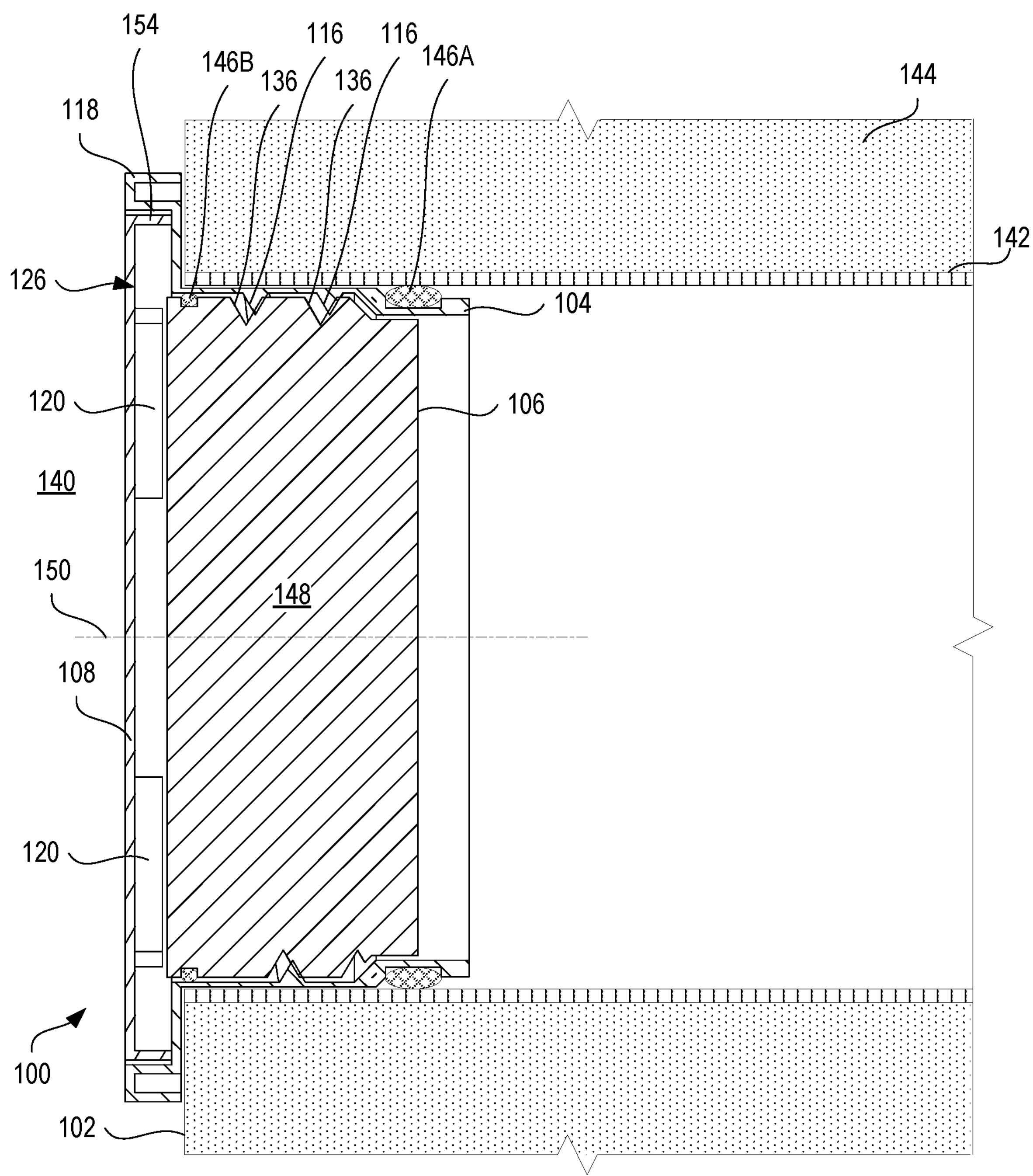
FIG. 6A is a cross-sectional view of an apparatus showing the duct blocked by a plug, in accordance with an embodiment.

FIG. 6A is a cross-sectional view of the apparatus 100 showing a duct 142 in a building structure 144 being blocked by the plug 106 of the apparatus 100, in accordance with an embodiment.

As shown in FIG. 6A, the tube 110 is inserted into a duct 142 and the plug 106 is threadably engaged with the tube 110. The tube 110 is adapted for insertion into the duct 142 so as to cause sealing engagement of the tube 110 with the duct 142. In some embodiments, a sealing member 146A (gasket) is positioned in the seat 114A so as seal the tube 110 against the duct 142 as the tube 110 is inserted into the duct 142. The sealing member(s) 146A may be suitable for surrounding the tube 110. In some embodiments, such a sealing member 146A may form a substantially airtight seal.

The plug 106 is adapted to engage with the tube 110 in place of threadable engagement of the tube 110 with a corrugated hose, to block the tube 110, and hence the duct 142, when the duct 142 is not in use. A cap 108 covers the plug 106. The cap 108 and the plug 106 serve to prevent flow communication between an indoor space 140 and an outdoor space (not shown) via the duct 142. Advantageously, the cap 108 may serve to mitigate flow communication, including under loss of the plug 106 without requiring additional plugs.

A sealing member 146B (gasket) is positioned in the seat 114B so as to seal the plug 106 against the body 104 to sealingly close the tube 110. The sealing member 146B may be squeezed between the tube 110 and the plug 106 as the plug 106 is rotatably engaged with the tube 110. In various embodiments, advantageously, a tight fit may thereby be achieved with relative ease. Advantageously, in some embodiments, sealing member 146A, 146B may together allow a substantially complete airtight seal of the apparatus 100 in the structure 144 when not in use.

As shown in FIG. 6A, a rim may extend between the inner face 126 of the cap 108 and the tube 110 so as to space the plurality of tabs 120 axially away (along the axis 150) from the tube 110 when the cap 108 is rotated onto the flange 112. In the embodiment shown in FIG. 6A, such a rim is the rim 154 of the cap 108. However, it is understood that, in some embodiments, the rim may be a rim of the flange 112, e.g. the outer rim 118. Advantageously, this may facilitate non-interference of the plurality of tabs 120 with the tube 110 and the plug 106. For example, a mechanism for clamping of the plug 106 on to the cap 108 that allows an efficient form factor while avoiding interference with the flange 112, and the plug 106 (while the plug is inserted into the tube 110), may be achieved.

In some embodiments, rim 118 of the flange 112 may be positioned outward of the cap 108 when the cap 108 is received on to the flange 112 so as to obstruct displacement of the cap 108. The displacement of the cap 108 may in a direction parallel to the wall 102 or parallel to the flange 112 adjacent to the tube 110 may be mitigated. Advantageously, this may prevent the cap 108 from falling off of the flange 112 in the event the pivoting connection between the flange 112 and the cap 108 is broken. For example, the attachment of the cap 108 to the flange 112 may be particularly vulnerable to breakage when the cap 108 is left open with the plug 106 clamped thereon while an air-conditioning hose is connected to the duct 142.

As shown in FIG. 6A, the plug may include an insulator 148. The insulator 148 extends axially (along the central axis 150) at least partially across the plug 106. The insulator 148 mitigates thermal loss across the duct 142 in response to the plug 106 being received in the tube 110.

In various embodiments, the insulator 148 may extend at least partially, or fully, across the one or more grooves 136 of the plug 106 to mitigate thermal loss across the duct 142 in response to the plug 106 being (fully) received in the tube 110. In some embodiments, the plug 106 may be configured to engage with the body 104 such that the insulator 148 extends axially beyond at least, or all, of the internal threads 116 in the tube 110 when the plug 106 is drawn fully into the tube 110 by threadable engagement. The insulator 148 being extended across the internal threads 116 in such a manner may prevent excessive heat transfer between indoor and outdoor spaces when the duct 142 is not being used.

The insulator 148 may comprise an insulating material disposed in a cavity in the plug 106 extending axially along the plug 106. In some embodiments, the insulator 148 may define a vacuum or low-density air cavity extending axially along the plug 106.

Figure 6B:
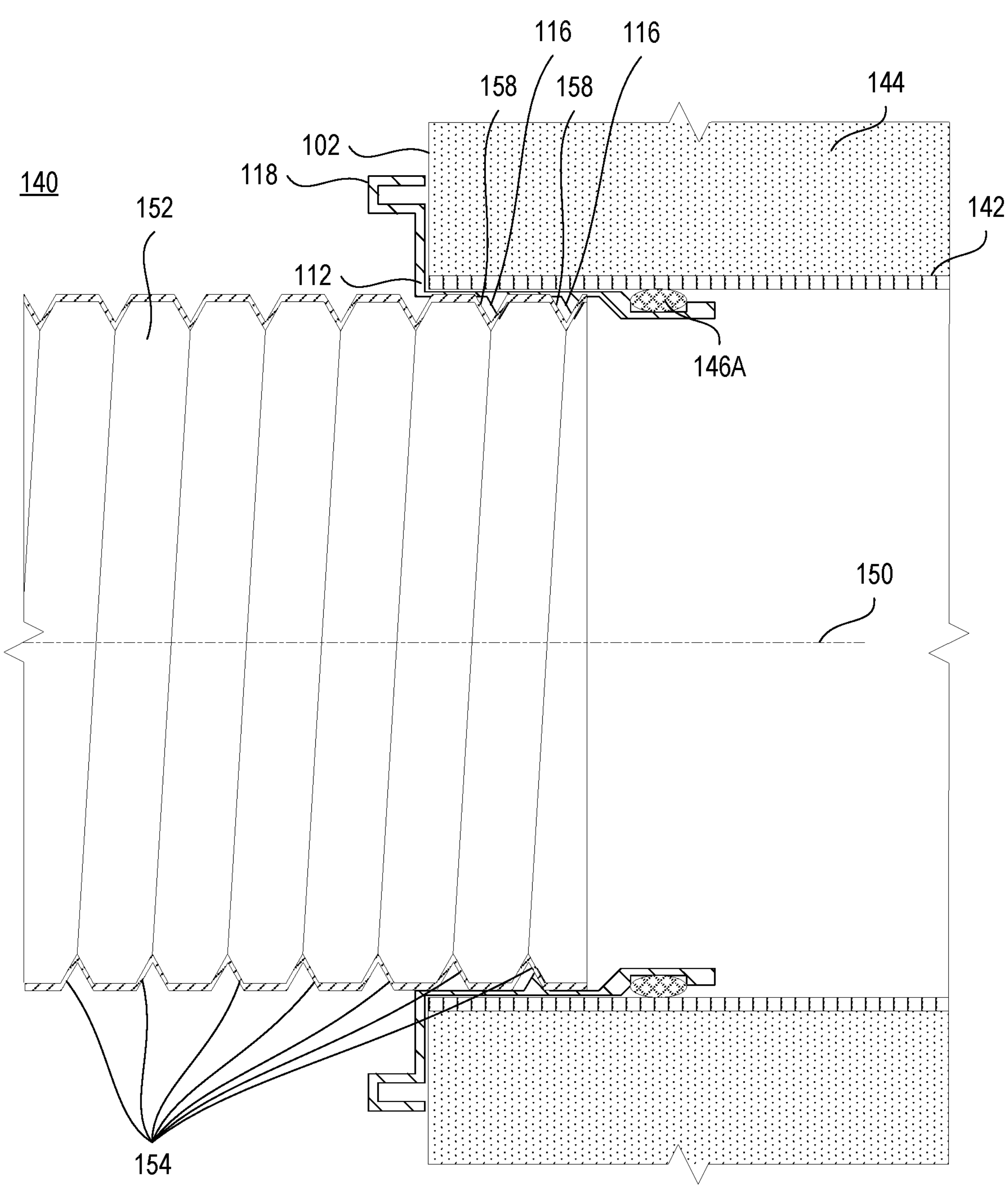
FIG. 6B is a cross-sectional view of an apparatus showing a hose threadably engaged with a body of the apparatus, in accordance with an embodiment.

FIG. 6B is a cross-sectional view of the apparatus 100 showing a hose 152 threadably engaged with the body 104 of the apparatus 100, in accordance with an embodiment. In particular, the tube 110 of the body 104 may be threadably engaged with the hose 152. An indoor end of the hose 152 may be connected to an air-conditioner or a first unit of a split-unit air-conditioner, while an opposite end of the hose 152 may be disposed inside the duct 142. In various embodiments, advantageously, the hose 152 may be allowed to terminate within the duct 142, e.g. within a short distance from an indoor end of the duct 142. For example, improved structural rigidity of the channels communicating fluids to and/or from the air-conditioner may be achieved, as well as faster and more convenient installation.

As shown in FIG. 6B, the hose 152 is corrugated along its length to allow threadable engagement therewith. The hose 152 shown in FIG. 6B defines one or more grooves 158 extending along a radially outer end of the hose 152 and facing an exterior of the hose 152. For example, the one or more grooves 158 may include a helical groove extending along a length of the hose 152 and which may be suitable for receiving a thread therein. In some embodiments, the one or more grooves 158 may comprises a plurality of axially spaced apart grooves circumferentially surrounding a centerline or central axis of the hose 152, e.g. such grooves may be circular grooves. The tube 110 may be configured so as to be threadably engageable with the grooves 158. Advantageously, fast and convenient mating of the body 104 with the air-conditioner with off-the-shelf hoses may be achieved, e.g. without the use of an adaptor.

Advantageously, the tube may mate with the duct 142 inside the wall 102, rather than outside, allowing for a low-profile construction. In various embodiments, a diameter of the duct 142 may be substantially similar to the diameter of the hose 152. A wall thickness of the tube 110 may be dimensioned so as to allow fitting of the tube 110 between the ducts 142 and the hose 152.

Figure 7:
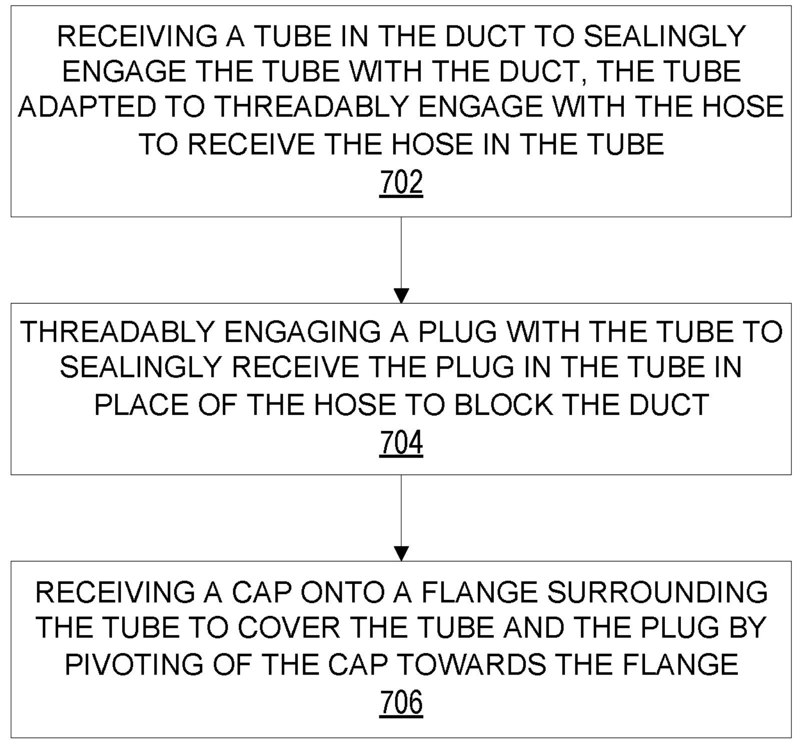
FIG. 7 is an exemplary flowchart of a method of terminating an air-conditioning duct.

FIG. 7 is an exemplary flowchart of a method 700 of terminating an air-conditioning duct.

The air-conditioning duct extends through a wall between an indoor space and an outdoor space to allow fluid communication therebetween via a hose that is suitable for removably mounting into the air-conditioning duct. The hose is corrugated along its length to allow threadable engagement.

Step 702 of the method 700 may include receiving a tube in the duct to sealingly engage the tube with the duct, the tube adapted to threadably engage with the hose to receive the hose in the tube.

Step 704 of the method 700 threadably engaging a plug with the tube to sealingly receive the plug in the tube in place of the hose to block the duct.

Step 706 of the method 700 receiving a cap onto a flange surrounding the tube to cover the tube and the plug by pivoting of the cap towards the flange.

In some embodiments of the method 700, the cap defines a plurality of tabs extending from an inner face of the cap and being positioned relative to each other to frictionally engage with opposite sides of the plug to allow clamping of the plug onto the cap when the plug is displaced out of the tube.

In some embodiments of the method 700, a rim extends between the inner face of the cap and the tube so as to space the plurality of tabs axially away from the tube when the cap is rotated onto the flange.

In some embodiments of the method 700, the rim is a rim of the cap.

In some embodiments of the method 700, the plurality of tabs comprise four arc-shaped protrusions distributed around a central axis to clamp on to a radially outer end of the cap, the radially outer end being circular.

In some embodiments of the method 700, threadably engaging a plug with the tube to sealingly receive the plug in the tube to block the duct includes engaging the plug with the tube such that an axially outer face of the plug is flush with the flange adjacent to the tube.

Some embodiments of the method 700 include receiving a tube in the duct to sealingly engage the tube with the duct via a first sealing member extending around the tube between the duct and the tube.

Some embodiments of the method 700 include threadably engaging one or more grooves of a plug with one or more internal threads of the tube that are complementary to the grooves of the hose to receive the plug in the tube to block the duct.

Some embodiments of the method 700 include drawing a second sealing member between the plug and the body to sealingly engage the plug with the body to seal the tube, the second sealing member extending around the plug.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, a releasable fastener may be included on the cap to releasably fasten the cap to the flange, and the internal threads on the body may be left-handed or right-handed threads so as to engage with a hose having corresponding grooves. Yet further modifications could be implemented by a person of ordinary skill in the art in view of the present disclosure, which modifications would be within the scope of the present technology.

What is claimed is:

1. An apparatus for removable mounting of a hose into an air-conditioning duct extending through a wall between an indoor space and an outdoor space to allow fluid communication therebetween via the hose, the hose being corrugated along its length to allow threadable engagement, the apparatus comprising:
- a unitary body, including
  - a tube that is threadably engageable with the hose and adapted for insertion into the duct so as to cause sealing engagement of the tube with the duct,
  - a planar flange disposed at an end of and substantially flush with the tube for abutting the wall around the duct upon the tube being fully inserted into the duct;
- an insulated plug adapted to threadably engage with the tube in place of threadable engagement of the hose with the tube so as to allow sealing of the insulated plug against the body to sealingly close the tube when the hose is displaced out of the tube; and
- a cap pivotably attached to the planar flange to allow the cap to be rotated towards the planar flange to cover the tube.

2. The apparatus of claim 1, wherein the cap defines a plurality of tabs extending from a face of the cap and being positioned relative to each other to frictionally engage with opposite sides of the insulated plug to allow clamping of the insulated plug onto the cap when the insulated plug is displaced out of the tube.

3. The apparatus of claim 2, wherein the face is an inner face of the cap, and a rim extends between the face of the cap and the tube so as to space the plurality of tabs axially away from the tube when the cap is rotated onto the planar flange.

4. The apparatus of claim 3, wherein the rim is a rim of the cap.

5. The apparatus of claim 2, wherein the plurality of tabs comprise four arc-shaped protrusions distributed around a central axis to clamp on to a radially outer end of the insulated plug, the radially outer end being circular.

6. The apparatus of claim 2, wherein the insulated plug and the tube are configured to engage with each other such that an axially outer face of the insulated plug is flush with the planar flange adjacent to the tube when the insulated plug is fully engaged with the tube.

7. The apparatus of claim 2, wherein the planar flange comprises a plurality of apertures for fastening the body onto the wall around the duct.

8. The apparatus of claim 2, wherein the planar flange defines an outer edge that is rectangular, a rim of the planar flange extending along first and second sides of the outer edge that are opposite to each other, the cap being pivotably attached to a third side of the outer edge to allow pivoting of the cap towards and away from a fourth side of the outer edge opposite to the third side, the rim of the planar flange being positioned outward of the cap when the cap is received on to the planar flange so as to obstruct displacement of the cap parallel to the wall.

9. The apparatus of claim 8, wherein the rim of the planar flange extends along the fourth side of the outer edge, a slot being formed in the rim along the fourth side, the slot being complementary to a tongue extending outwardly from the cap so as to be received in the slot when the cap is rotated on to the planar flange.

10. The apparatus of claim 2, wherein the insulated plug includes an insulator in the form of a vacuum cavity, insulating material-filled cavities, or insulating material in unitary construction to mitigate thermal loss across the duct in response to the insulated plug being received in the tube.

11. A method of terminating an air-conditioning duct extending through a wall between an indoor space and an outdoor space to allow fluid communication therebetween via a hose that is suitable for removably mounting into the air-conditioning duct, the hose being corrugated along its length to allow threadable engagement, the method comprising:

- receiving a tube in the duct to sealingly engage the tube with the duct, the tube adapted to threadably engage with the hose to receive the hose in the tube;
- threadably engaging a plug with the tube to sealingly receive the plug in the tube in place of the hose to block the duct; and
- receiving a cap onto a flange surrounding the tube to cover the tube and the plug by pivoting of the cap towards the flange, the cap defining
  - a plurality of tabs extending from a face of the cap and being positioned relative to each other to frictionally engage with opposite sides of the plug to allow clamping of the plug onto the cap when the plug is displaced out of the tube.

12. The method of claim 11, wherein the face is an inner face of the cap, and a rim extends between the face of the cap and the tube so as to space the plurality of tabs axially away from the tube when the cap is rotated onto the flange.

13. The method of claim 12, wherein the rim is a rim of the cap.

14. The method of claim 11, wherein the plurality of tabs comprise four arc-shaped protrusions distributed around a central axis to clamp on to a radially outer end of the cap, the radially outer end being circular.

15. The method of claim 11, wherein threadably engaging a plug with the tube to sealingly receive the plug in the tube to block the duct includes engaging the plug with the tube such that an axially outer face of the plug is flush with the flange adjacent to the tube.

16. A building structure extending between an outdoor space and an indoor space, the building structure including a wall facing the indoor space, comprising:

- an air-conditioning duct that is formed in the wall, the air-conditioning duct extending between the indoor space and the outdoor space to allow fluid communication therebetween via a hose that is corrugated along its length to allow threadable engagement;
- a unitary body, including
  - a tube disposed inside the duct and sealingly engaged with the duct, the tube being adapted to threadably engage with the hose,
  - a flange disposed at an end of the tube so as to abut the wall around the duct;
- a plug threadably engaged with the tube in place of threadable engagement of the hose with the tube so as to cause sealing of the plug against the body to sealingly close the tube; and
- a cap pivotably attached to the flange to allow the cap to be rotated towards the flange to cover the tube, the cap defining
  - a plurality of tabs extending from a face of the cap and being positioned relative to each other to frictionally engage with opposite sides of the plug to allow clamping of the plug onto the cap when the plug is displaced out of the tube.

17. The building structure of claim 16, wherein the flange is fastened to the wall.

* * * * *